US005717430A

United States Patent [19]

Copland et al.

[11] Patent Number: 5,717,430
[45] Date of Patent: Feb. 10, 1998

[54] MULTIMEDIA COMPUTER KEYBOARD

[75] Inventors: James L. Copland, Paradise Valley; Gary Crunk; Klaus Muerzl, both of Phoenix, all of Ariz.

[73] Assignee: SC&T International, Inc., Scottsdale, Ariz.

[21] Appl. No.: 690,025

[22] Filed: Jul. 31, 1996

Related U.S. Application Data

[63] Continuation of Ser. No. 292,571, Aug. 18, 1994, abandoned.

[51] Int. Cl.$^6$ .................................................. H04B 1/40
[52] U.S. Cl. ........................ 345/168; 400/472; 341/22; D14/115; 364/708
[58] Field of Search ................................ 345/168, 169; 400/472, 485–490; 341/22; D14/115; 364/708.1

[56] References Cited

U.S. PATENT DOCUMENTS

| | | | |
|---|---|---|---|
| D. 363,928 | 11/1995 | Martin | D14/115 |
| D. 369,594 | 5/1996 | Vossoughi | D14/115 |
| 4,776,016 | 10/1988 | Hansen | 381/42 |
| 4,896,370 | 1/1990 | Kasparian et al. | 455/77 |
| 4,931,950 | 6/1990 | Isle | 364/513 |
| 5,033,804 | 7/1991 | Faris | 312/208 |
| 5,160,798 | 11/1992 | Morikawa et al. | 84/615 |
| 5,195,130 | 3/1993 | Weiss et al. | 379/98 |
| 5,208,745 | 5/1993 | Quentin | 364/188 |
| 5,245,558 | 9/1993 | Hachey | 364/708.1 |
| 5,283,638 | 2/1994 | Engberg | 348/14 |
| 5,283,819 | 2/1994 | Glick | 379/90 |

FOREIGN PATENT DOCUMENTS

| | | | |
|---|---|---|---|
| 119821 | 5/1989 | Japan . | |
| WO9104461 | 4/1991 | WIPO | G01D 15/00 |

OTHER PUBLICATIONS

Loveria, G., "Making The MPC Upgrade," BYTE, May 1993, pp. 176–190.
Quinn, J., et al., "Making Noise," PC Magazine, Jan. 11, 1994, p. 125.
Advertisement for Dell Multimedia Computer, copied contemporaneously with Document B.
Advertisement for Lexmark Keyboard, copied contemporaneously with Document B.
Advertisement for "Sound Galaxy" multimedia upgrade kit, copied contemporaneously with Document B.
Advertisement for Microsoft Sound System, copied contemporaneously with Document B.
Advertisement for Toshiba T6600C Copied contemporaneously with Document B.
Microsoft, 1993, 1 page advertisement, Windows Sound System; Voice regonition device.
Mouse with Ears, Dec. 1991, No. 332, Research Disclosure.

*Primary Examiner*—Mark R. Powell
*Attorney, Agent, or Firm*—O'Connor, Cavanagh; John D. Titus

[57] ABSTRACT

A multimedia computer keyboard that is adaptable to new or existing computer systems. The computer keyboard has built-in full range stereo speakers with a control panel located above the standard alphanumeric and function key pads. The computer keyboard also has external headphone and microphone jacks with interrupt circuitry. The standard alphanumeric and function key pad circuitry and the audio circuitry are maintained as separate circuit components within the multimedia computer keyboard housing. Individual component cables are combined into a single cable that connects the multimedia computer keyboard to the computer CPU terminal. Also, floppy disk drive, CD-ROM disk drive and telecommunications components may be incorporated into said multimedia computer keyboard system.

23 Claims, 9 Drawing Sheets

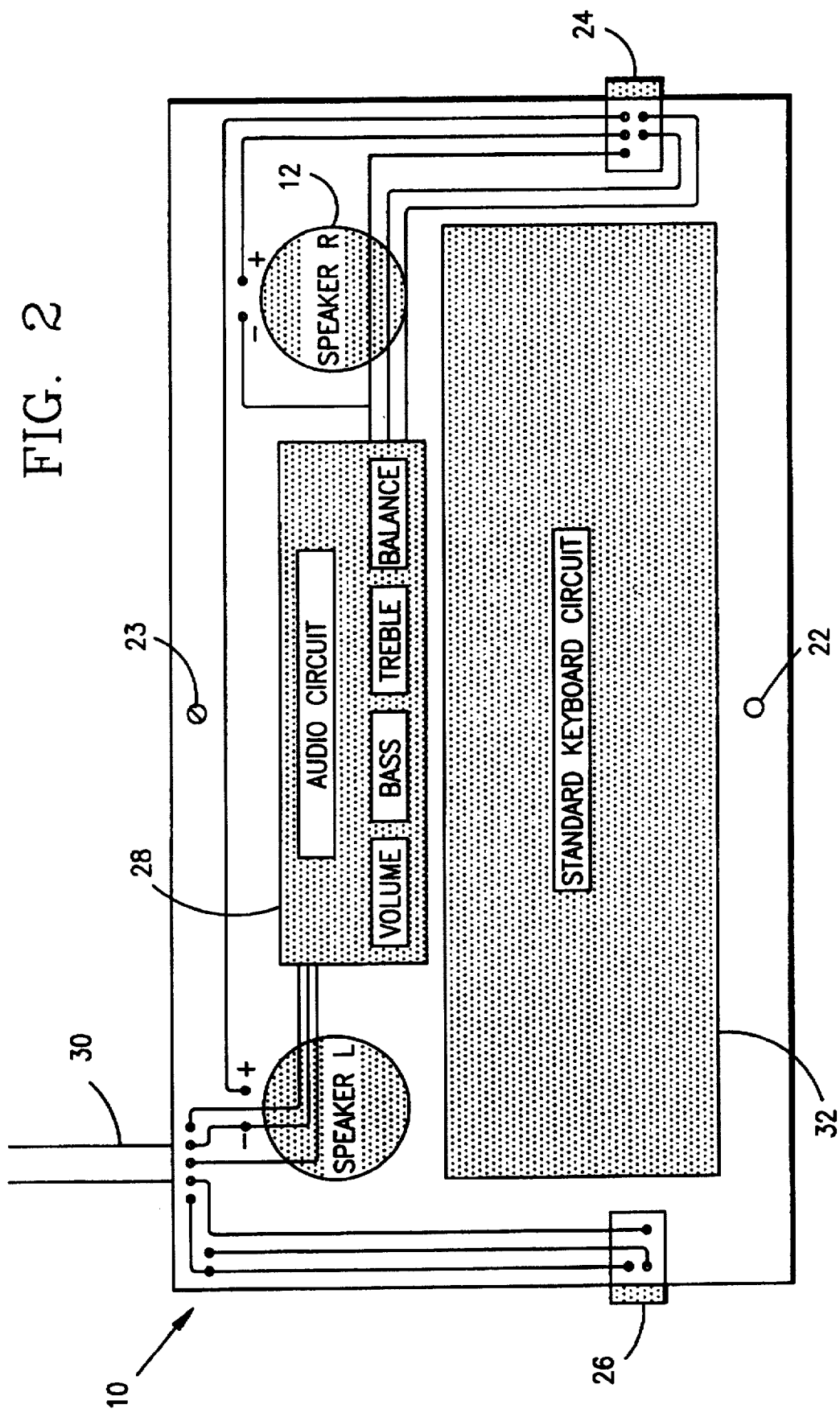

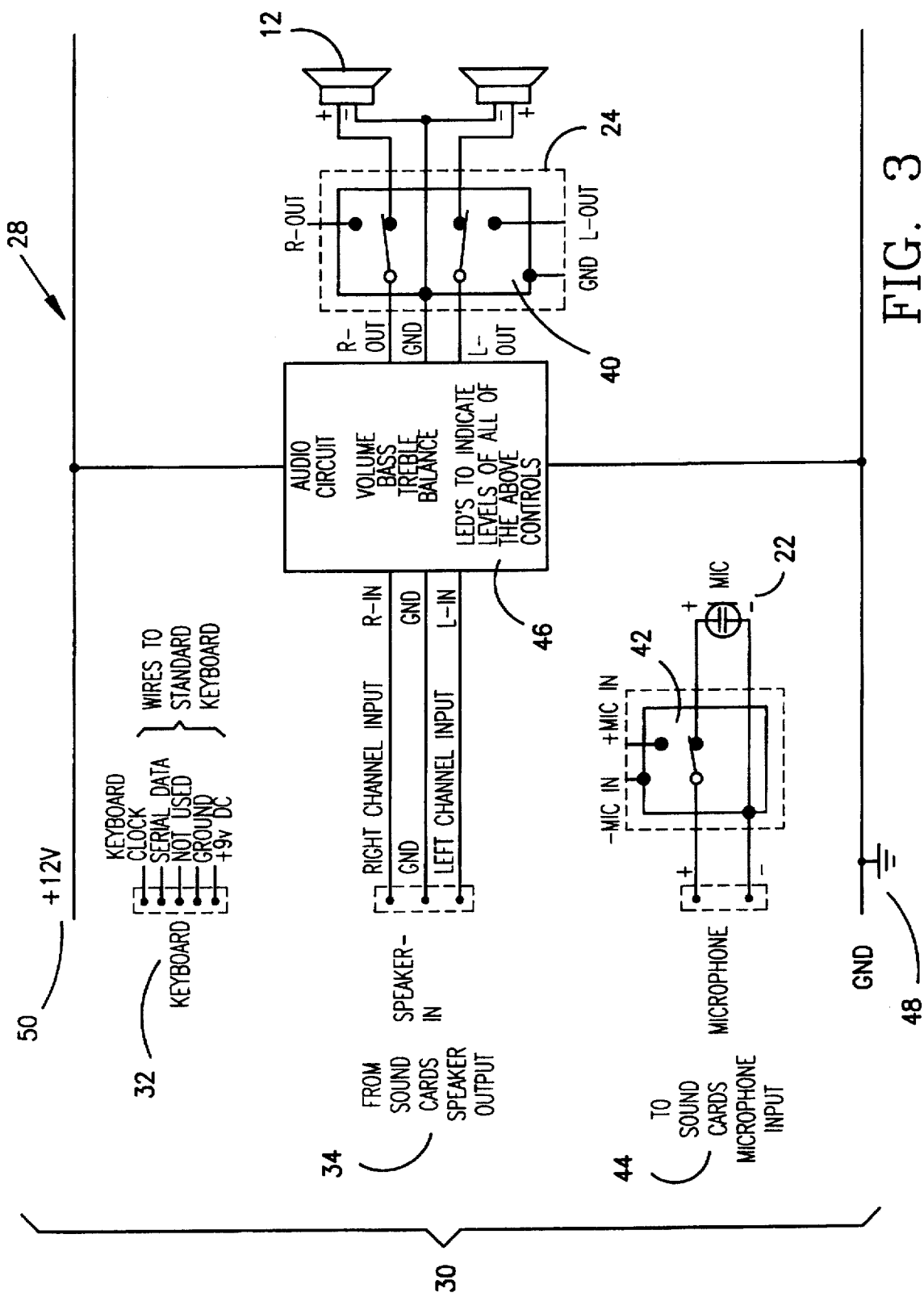

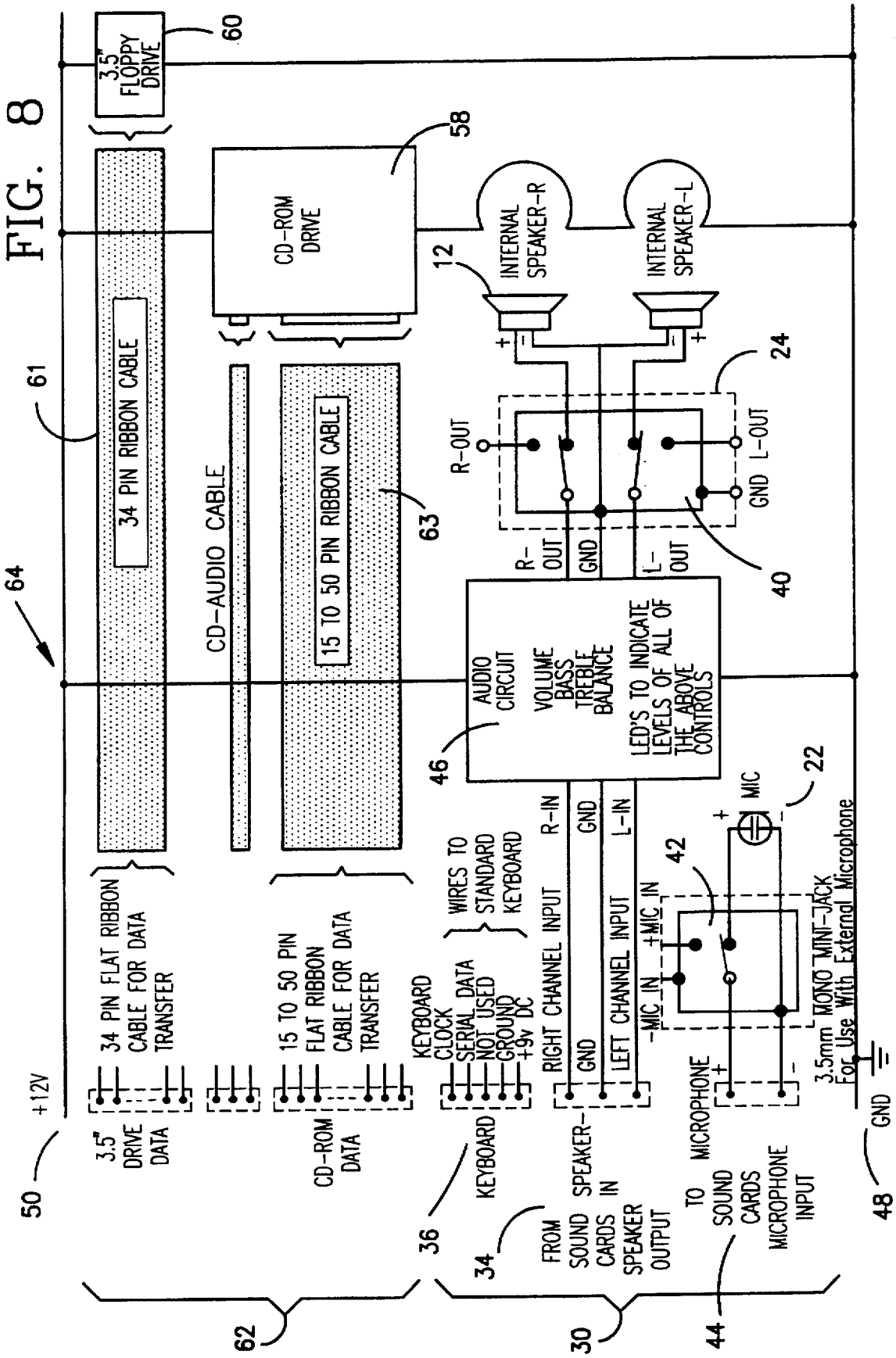

MULTIMEDIA COMPUTER KEYBOARD

This application is a continuation of Ser. No. 08/292,571, filed Aug. 18, 1994, now abandoned.

BACKGROUND OF THE INVENTION

1. Field of Invention

This invention relates to computer keyboards, specifically to an improved keyboard with multimedia capabilities.

2. Discussion of Prior Art

In recent times, numerous electronic technologies including audio signal processing, video signal processing and data processing have become more available to individual computer users. With more advanced electronic technology available to computer users, new and different hardware needs for entertainment and work applications have arisen.

Two areas in which needs for improved computer hardware exist are multimedia and telecommunications. Multimedia refers to the integration of text, audio, graphics, still image and moving pictures into a single, computer-controlled, product. It also includes the combination of powerful computers, video disks, CD-ROM readers, floppy disks or compact disk players, video monitors, free-standing speakers, optical scanners, audio sound cards and music synthesizers, linked together by powerful software.

Today, more and more computers are being equipped with video sound cards and CD-ROM drives as standard hardware. Alternatively, up-grade kits facilitate the addition of sound cards, CD-ROM drives and external speaker capabilities. However, the multimedia kit hardware components are usually not compatible with one another, or are poorly equipped to handle the multimedia user's needs. For example, the standard computer keyboard design central to the computer system has not been improved in nearly 20 years. Recent software advances have demanded more from computer hardware; however, computer hardware manufacturers have merely added external connectors and features instead of efficiently redesigning existing or designing new computer hardware equipment.

In recent attempts to provide more useful multimedia-compatible hardware, computer manufacturers have increased the sophistication of their external speakers. A published magazine article recently surveyed the multimedia hardware industry. "Making the MPC Upgrade," Greg Loveria, BYTE May 1993, pp. 176-90. The article states that "[t]he MPC Marketing Council's definition of an MPC system includes five basic components: a PC, a CD-ROM drive, an audio adapter, Microsoft Windows with multimedia extensions, and a set of speakers or headphones for audio output." The article lists many external components that may be added to enhance multimedia computer systems; but fails to teach or suggest methods of efficiently unifying separate multimedia components. Thus, not even leading multimedia computer manufactures have addressed the issue of streamlining the cumbersome hardware components.

Some manufacturers have made computer monitors with built-in speakers. This design has a major drawback in that these monitors are expensive and are not usually compatible with existing CPU terminals. These problems further cause users to expend unnecessary amounts of money for simple up-grades. Other manufactures have developed speaker systems that may be placed between the computer monitor and the computer CPU terminal or between the desk top and the computer CPU terminal. This design allows a multimedia user to stack components to avoid having side-by-side speakers. This, however, has severe drawbacks including that space may be vertically limited on a desk top, and the speaker sound system may create interference feedback through the external microphone. In this invention, the multimedia computer keyboard has been designed to avoid such feedback problems common in the industry, by use of internal keyboard speakers.

Thus, current multimedia systems utilize cumbersome individual external hardware items that occupy considerable space. For example, in the multimedia industry, standard speakers, CD-ROM drives, external microphones and headphones are usually placed beside the computer CPU terminal or on the desk top, often along with one or more CD-ROM drives.

These and other external features create a disorderly and cumbersome design. Furthermore, installation of each external hardware component requires numerous external wires and cables that feed into the CPU computer terminal, power outlets, CD-ROM drives, microphones, headphone sets, sound cards, and the standard keyboard. All these components, as well as other devices, severely clutter the user's desk top and work area.

U.S. Pat. No. 5,283,638 issued to Engberg et al. teaches a personal computer work station that performs telecommunications and multimedia functions. Engberg et al. also shows methods of incorporating into a standard computer CPU terminal the capabilities of sound cards, telephones, faxes, voice signals and television signals. In essence, the computer system merely provides users with the ability to connect external features to a computer CPU terminal in order to perform the desired multimedia and communication tasks. Thus, the problem of having a clutter of external multimedia features and excessive external connect cables is not solved, but rather it is exacerbated. Engberg et al. therefore teaches a computer CPU terminal with expanded capabilities, but does not provide a solution to streamline, unite or eliminate cumbersome external individual multimedia hardware features. Generally, the more capabilities the computer CPU terminal is equipped with, the more individual external hardware components will be called for.

Similarly, U.S. Pat. No. 5,283,819 issued to Glick et al. shows a computer CPU terminal with increased capabilities. These capabilities include remote-controlled computing and multimedia entertainment features. Also included are television, radio, audio, visual, telephone, data, fax, voice, volume, bass, and tone features that demand additional external hardware components. Although providing the computer terminal with these capabilities may be novel, these added capabilities create a clutter of external hardware components.

U.S. Pat. No. 5,208,745 issued to Quentin et al. shows a computer system with integrated multimedia capabilities. The user is provided with a CPU computer system that includes a standard keyboard, CD-ROM, floppy disk, and video monitor. These features are all contained in a single independent laptop-type computer. The invention's multimedia interfacing system is designed to operate in parallel with expert system software applications. This invention merely teaches improved software/hardware interfacing techniques. While software/hardware integration may be an advance in interfacing, Quentin et al. fails to teach or suggest methods for unifying and streamlining multimedia hardware features to solve the cumbersome external hardware clutter problem. Furthermore, Quentin et al. does not provide owners of new or current computer systems the option of compatibly up-grading their multimedia computer hardware.

U.S. Pat. No. 4,931,950 issued to Isle et al. also teaches methods of interfacing with multimedia computer systems. Similar to Quentin et al., Isle et al. does not teach or suggest methods of unifying external multimedia hardware. Further, Isle et at. fails to show methods for improving the compatibility with new or existing computer CPU terminals.

In general, the prior art multimedia systems merely provide users with increased capabilities while ignoring the problems of: (1) up-grading compatibility with new or existing computer CPU terminals; (2) cumbersome individual external hardware components; (3) excessively cumbersome connecting cables; (4) poor speaker arrangement and performance; and (5) excessive cost to convert and provide new or existing computers systems with multimedia capabilities.

SUMMARY OF THE INVENTION

This invention provides users of existing and new computer multimedia systems with means for efficiently uniting and integrating external multimedia computer hardware components into a useful, novel, compact, multi-functional computer keyboard.

Briefly, in accordance with the preferred embodiment of the invention, there is provided a computer keyboard means with multimedia capabilities. First, the keyboard means includes the standard alphanumeric keys and function pads. In addition to the standard keys and function pads, the keyboard may also include a combination of features such as: (1) full range stereo audio capabilities that include but are not limited to controls for bass, treble, balance and volume; (2) an integral or external hands-free microphone means with connection jacks; (3) means for headphone jack; (4) interrupt circuitry for the speaker means, microphone means and headphone means; (5) analog or digital audio circuitry design that is independent of the standard digital alphanumeric computer keyboard circuitry; (6) integrated CD-ROM drive means; (7) floppy disk drive means; (8) a single universal cable that connects the keyboard to the computer CPU terminal, sound card and power source; (9) a separate audio power-line means for increased audio performance and control; and (10) full compatibility with new or existing computer CPU terminals and sound cards for up-grading or replacing current cumbersome external multimedia features.

It is a principal objective of the present invention to provide a universal multimedia computer keyboard that unites external hardware features into a compact, space-efficient and user-friendly design, while improving sound performance and reducing feedback problems.

In addition, other objectives of this invention are:

1. To eliminate excessive external hardware components while providing features such as high-quality multimedia sound, text, voice, telephone, CD-ROM drive and floppy disk interfacing;

2. To provide a multimedia computer keyboard that is compatible with existing and new personal computer means;

3. To provide a multimedia computer keyboard that is equipped with a direct power supply means from a computer's CPU terminal for providing improved audio and control;

4. To provide a computer keyboard means that separates the standard keyboard circuitry means and the audio circuitry means;

5. To provide a multimedia universal computer keyboard connecting cable means that unites features like a standard keyboard cable, speaker cables, power cable, telephone cable, CD-ROM drive cable, floppy disk and microphone cable. The cable unification means also provides the multimedia computer keyboard with an efficient, non-cumbersome method of installing the novel keyboard into new or existing computer CPU terminals and sound cards;

6. To provide a fully-integrated, multimedia computer keyboard means that combines high performance speakers means with features like volume, treble, bass, balance, equalizers, LED indicators and control panels;

7. To provide integrated features such as an attached pivoting, retractable or internal hands-free microphone means, external microphone jacks means, headphone jacks means, external speaker jacks means for additional speakers, hands-free telephone capabilities, an integrated CD-ROM disk drive means and floppy disk drive means.

8. To provide a microphone arrangement that reduces unwanted feedback caused by external noise and the speaker means.

Other objects and advantages of the invention will become apparent upon reading the following detailed description and upon reference to the drawings.

BRIEF DESCRIPTION OF THE DRAWINGS

FIG. 2 shows the electronic component layout of a standard computer keyboard incorporating audio circuitry;

FIG. 3 is a circuit diagram of a preferred embodiment of the computer keyboard audio circuitry according to the invention;

FIG. 8 is a diagram of FIG. 7 showing the preferred audio, floppy disk drive and CD-ROM drive circuitry layout.

While the invention will be described in connection with the preferred embodiments, it will be understood that it is not intended to limit the invention to those embodiments. On the contrary, it is intended to cover all alternatives, modifications, and equivalents which may be included within the spirit and scope of the invention as defined by the appended claims.

DESCRIPTION OF THE PREFERRED EMBODIMENT AND METHOD

Figure 1A:
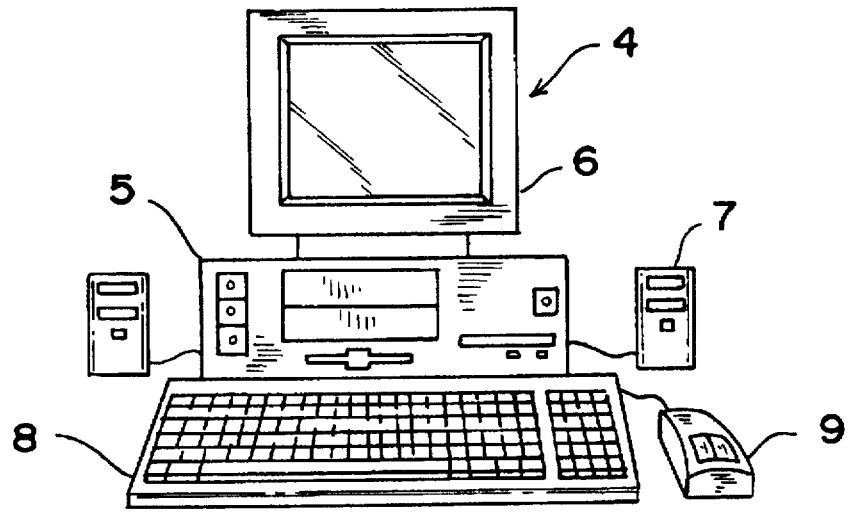
FIG. 1(a) is a perspective view of the prior art keyboard attached to a multimedia computer system with external speakers.

Referring now to FIG. 1(a), a prior art multimedia system 4 is shown with a basic computer monitor 6, side-by-side speakers 7, CPU computer terminal 5, mouse 9 and a standard keyboard 8. The standard keyboard 8 does not have audio, microphone jacks, headphone jacks or any of the features of the preferred embodiment.

Figure 1B:
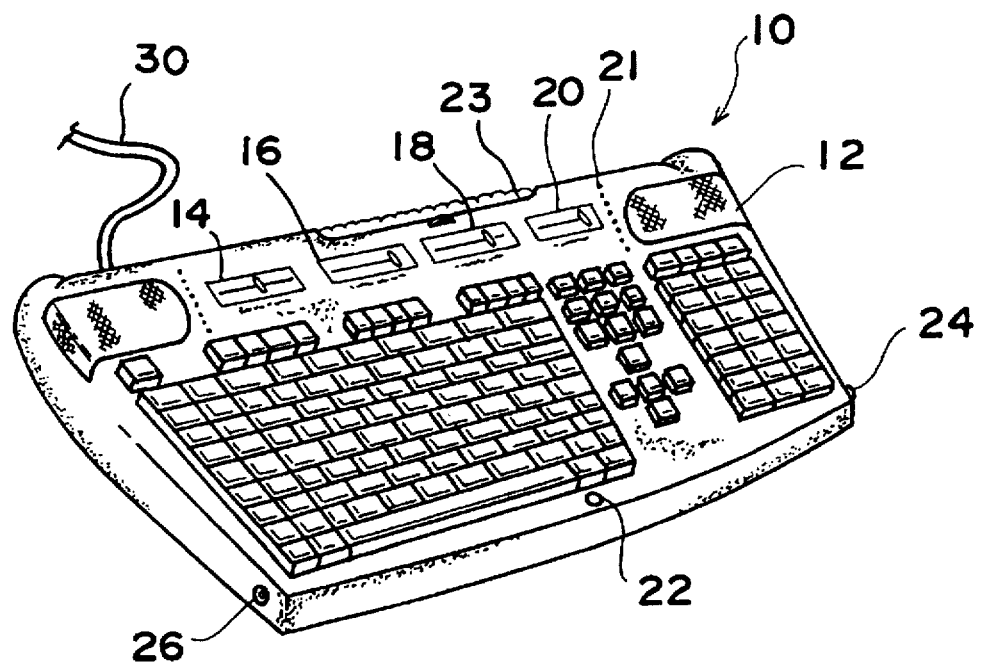
FIG. 1(b) is a perspective view of a computer keyboard of the preferred embodiment equipped with multimedia capabilities.

The basic configuration of the multimedia computer keyboard's preferred embodiment is shown in FIG. 1(b). Generally, the multimedia computer keyboard 10 begins with a basic keyboard layout, but in addition, speakers 12 are preferably located in the upper-most corners of the multimedia computer keyboard 10. An audio control panel is located above the alphanumeric and function keys and between the speakers 12. The audio control panel comprises a volume control 14, a balance control 16, treble control 18 and a bass control 20. Additional controls may be incorporated as part of the invention if more precise audio tuning is desirable.

Additionally, the multimedia computer keyboard 10 may contain an LED display 21 to indicate audio performance and response. Preferably, the LED display 21 will be located near the audio panel, however, a variety of sizes, shapes or configurations of the LED display 21 may be arranged on or around the multimedia computer keyboard 10. For example, an equalizer type LED display and control panel may be incorporated on the face of the keyboard.

The multimedia computer keyboard 10 also includes a variety of jacks for connecting external hardware, including, for example, input and output jacks. The microphone jack 26 and headphone jack 24 are preferably located in the front left and right portions respectively of the multimedia computer keyboard 10.

A cable 30 is also located at the upper top section of the multimedia computer keyboard 10. Preferably, the cable 30 carries or contains a multitude of smaller cables that service different electronic devices or components within the multimedia computer keyboard 10. For example, the cable 30 may contain, but is not limited to: audio circuitry cables, speaker cables, headphone and microphone cables, digital keyboard alphanumeric and function cable, sound card connect cables, power-source cables, floppy disk drive and CD-ROM disk drive cables, and any other cables that may be incorporated into the keyboard to facilitate multimedia interfacing. The cable 30 also facilitates installation and provides for an efficient clutter-free desk top area.

Also included in the preferred embodiment is built-in microphone 22 that is preferably located at the lower front-center section of the multimedia computer keyboard 10. The microphone 22 provides users with hands-free operation for voice input. Additionally, the microphone 22 is designed to avoid unwanted feed-back from either the speakers 12 or external interference noise.

The arrangement and location of the microphone input is of critical importance. The microphone 22 is located at the front-center section of the multimedia computer keyboard 10 so as to avoid sound interference from the speakers 12 or external noise. When the sound waves travel symmetrically away from speakers 12 and towards the microphone 22, the sound waves are at their lower intensity level. Thus, the location of microphone 22 prevents unwanted feedback while maintaining the a high quality of voice input response.

Alternatively, microphone 23 may be integrated into the upper top section of the multimedia computer keyboard 10 in a retractable and extendable arm arrangement that also utilizes the anti-feedback arrangement. Still another alternative would incorporate a plug-in hand-held microphone for alternative voice input.

FIG. 2 shows the electronic component layout wherein the audio circuit 28 is located above and separate from the keyboard circuit 32. The audio circuit 28 is self contained and separate from the keyboard circuit 32, that allows for efficient modifications of, alterations to, or up-grades of the multimedia computer keyboard 10 without purchasing new hardware. The speakers 12 are preferably located in the upper left and right corners of the multimedia computer keyboard 10. Also shown are the electrical connecting circuitry lines that connect the microphone jack 26, headphone jack 24, speakers 12, attached microphone 22 and audio circuitry 28 to the cable 30. However, the detailed connecting circuitry may be arranged in a variety of ways to meet alternative multimedia computer keyboard 10 design needs.

FIG. 3 shows the electronic circuit layout for the preferred embodiment of the multimedia computer keyboard 10. The schematic shows the audio circuitry 28 wherein the speakers 12 are connected to the LED indicator and audio circuitry 46. The speakers are also connected to the headphone jack 24, which is integrated as part of the audio interrupt circuitry 40. The audio interrupt circuitry 40 allows a user to attach any type of external speakers such as headphones (not shown) or home stereo speakers (not shown) via the headphone jack 24. When headphones or external speakers are connected via the headphone jack 24, the audio interrupt circuitry disengages the internal speakers 12 and only provides audio conduction and sound to the externally connected speakers or headphones.

The attached microphone 22 also has integrated microphone interrupt circuitry 42 that disengages the internal or attached microphone 22 when an external microphone (not shown) is connected to the microphone jack 26.

Connected to the LED indicator and audio circuitry 46 is the sound card speaker output connection 34. The sound card speaker output 34 allows the audio circuit 28 to receive audio signals from a CPU computer terminal (similar to the CPU terminal shown in FIG. 1(a), 5) after it has been sampled and converted to an analog signal by an sound card (not shown). A sound card may either be integrated into the computer's CPU mother board or may be in the form of an up-grade computer card. Existing computers are usually up-graded by installing the sound card in the rear of a CPU computer terminal.

Connected to the microphone interrupt circuitry 42 is the sound card microphone input 44. The sound card microphone input 44 is connected to the sound card that is then connected to a CPU computer terminal. Also shown in FIG. 3 is the voltage source 50 that reads 12 volts, however, any variety of voltages may be incorporated to achieve the desired electrical performance. In this invention, 12 volts are used to achieve the preferred audio performance not achievable by utilizing the industry standard 5 volt power source. The ground connect 48 is the reference from which the voltage source 50 is measured. The keyboard circuit 32 is also shown, but it is preferably independent of the audio circuit 28.

The audio circuit 28 has a ground connect 48, a sound card microphone input 44, a sound card speaker output 34, keyboard circuit 32 and a voltage source 50 that are all united as part of a universal cable 30. The cable 30 is then connected to the various plugs or connections at the rear of a CPU computer terminal.

Figures 4A, 4B:
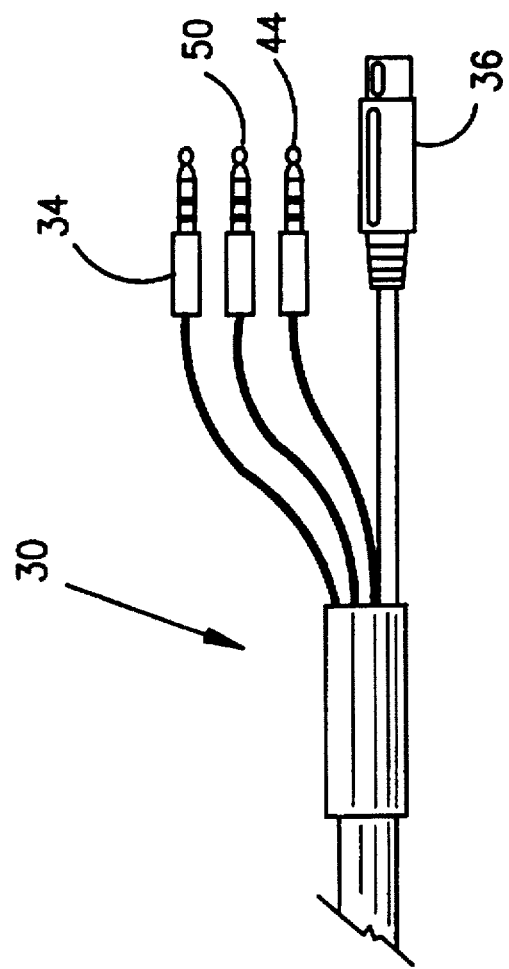
FIG. 4(a) and (b) show cross-sectional and side views, respectively, of a preferred embodiment of integrating keyboard cables into one universal multimedia cable according to the present invention.

FIG. 4(a) shows a cross-sectional view of the cable 30. The cable 30 provides a convenient method of wiring various multimedia component parts for efficient interconnection and interfacing. Contained within cable 30 is the keyboard circuit cable 36, the voltage source 50, the sound card speaker output 34 and the sound card microphone input. Internal cables are electrically insulated from each other and are then contained within a larger insulating electrical shell.

FIG. 4(b) further shows a side view of cable 30 that includes the internal cables shown in FIG. 4(a). Cable 30 then shows the internal wires with the preferable attached conductive connectors. The connectors are of the type used to facilitate prompt and efficient installation. Also, connections for telecommunications, CD-ROM disk drives, floppy disk drives and other components may also be contained within cable 30 depending on the electrical features desired or required for properly interfacing with the multimedia computer keyboard 10 or to meet hardware demands set by new software.

Figure 5:
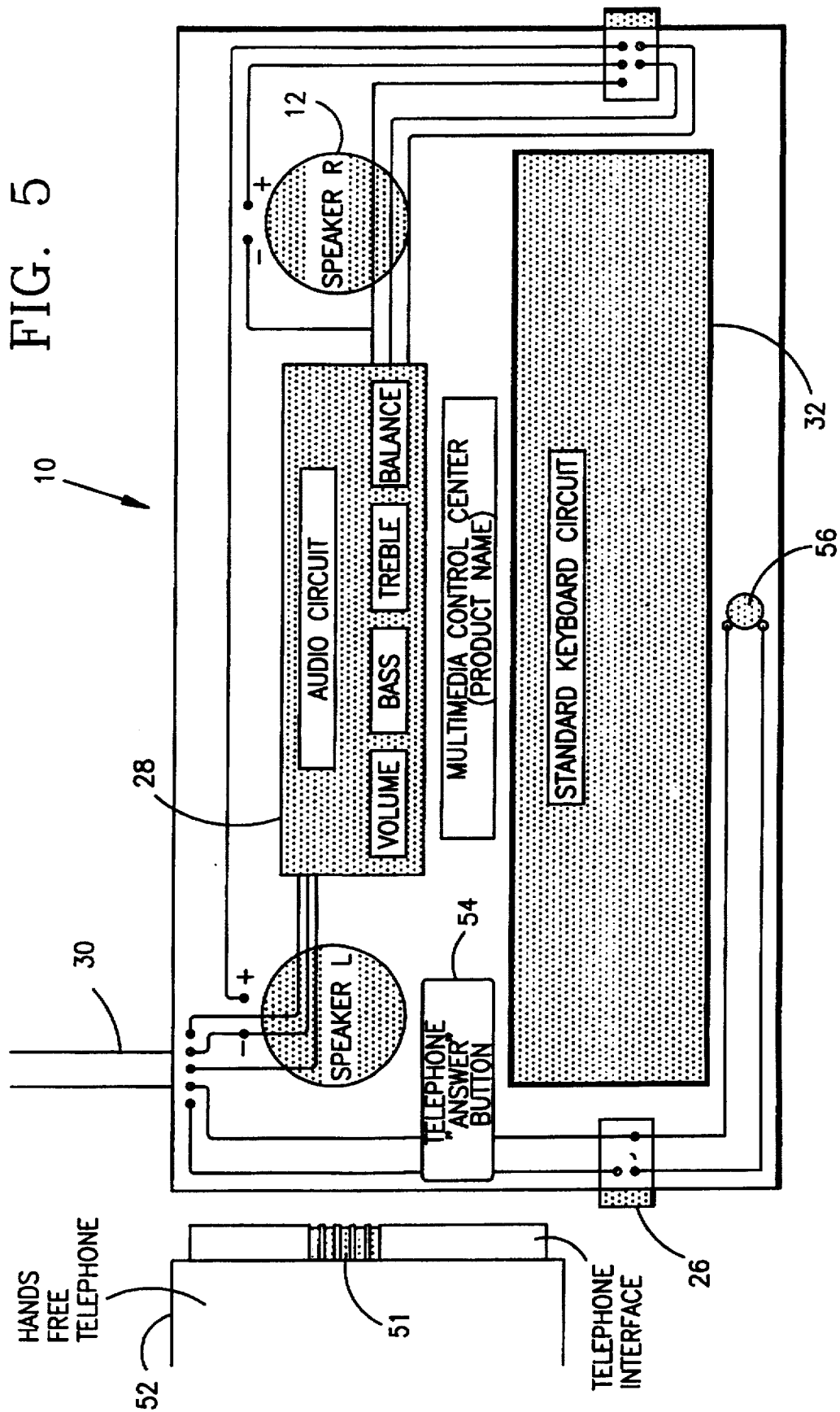
FIG. 5 shows a pictorial layout of a preferred computer keyboard embodiment according to the invention.

FIG. 5 shows a multimedia computer keyboard 10 component and circuit layout that includes telephone 52. Telephone 52 is connected to the multimedia computer keyboard via a communication connector 51. The communication connector 51 allows the telephone 52 to be integrated and used hands-free. That is, multimedia computer keyboard 10 has an answer control switch 54 for answering and terminating voice communications without having to use a standard hand-held telephone.

Alternatively, microphone 56 would also allow voice input and communication via the telephone 52. Microphone 56 is electrically connected to the microphone jack 26 and also to the answer control switch 54. Although in the preferred embodiment the individual electrical elements are arranged as shown in FIG. 5, alternative arrangements are foreseeable depending on the user's needs.

Figure 6:
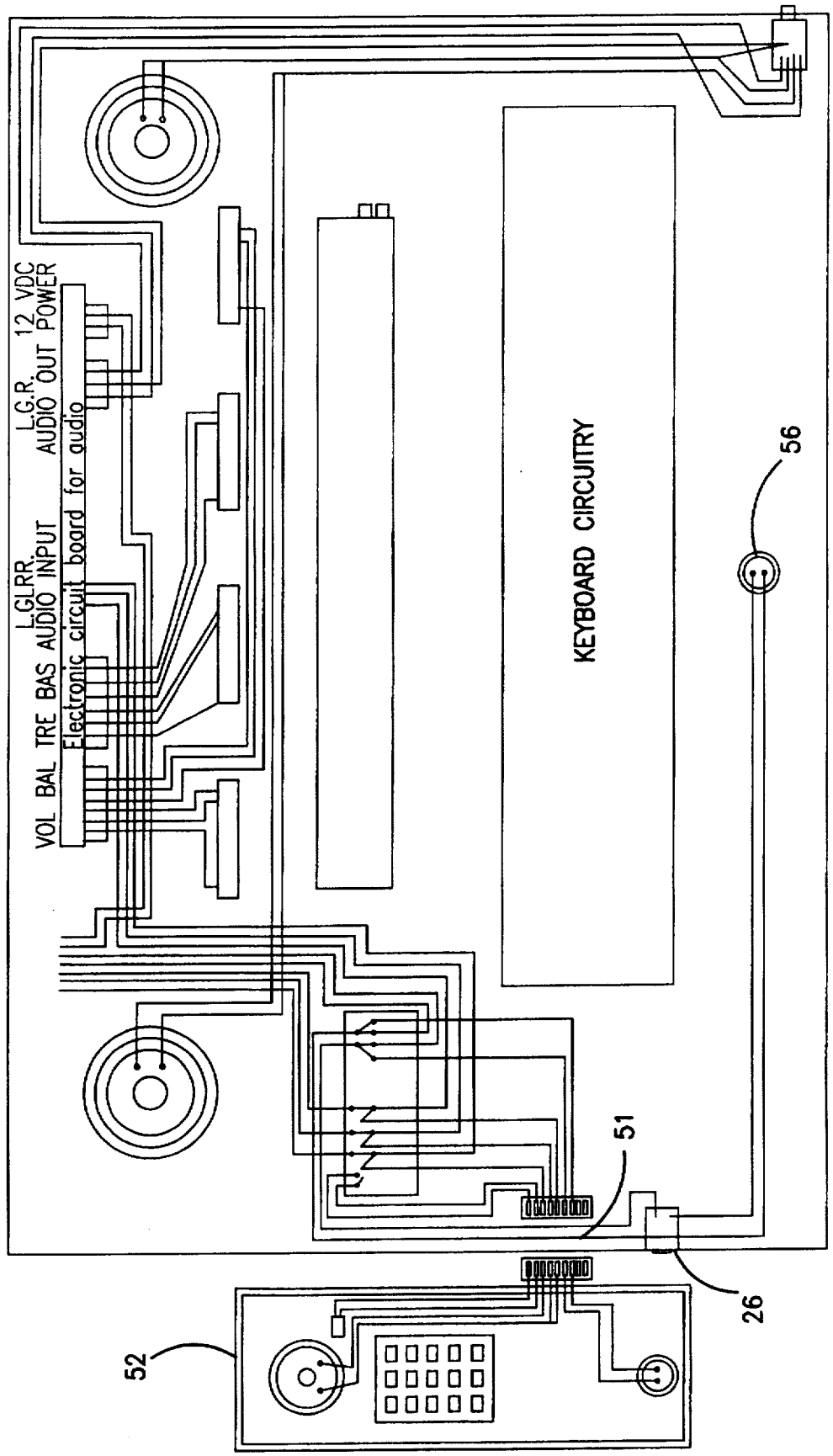
FIG. 6 shows a circuit diagram of the computer keyboard circuitry preferred embodiment incorporating communication capabilities according to the invention.

FIG. 6 shows the multimedia computer keyboard 10 with the attached telephone 52. In particular, the preferred electrical connections are shown, however, alternative circuitry layouts may be incorporated depending on the particular needs of the multimedia computer keyboard 10 user or manufacturer. Also shown is microphone 56 and its electrical interconnections with microphone jack 26 and the communications connector 51. While telephone 52 is externally connected to one side of multimedia computer keyboard 10, it may be attached to either side or may also be integrated internally.

Figure 7:
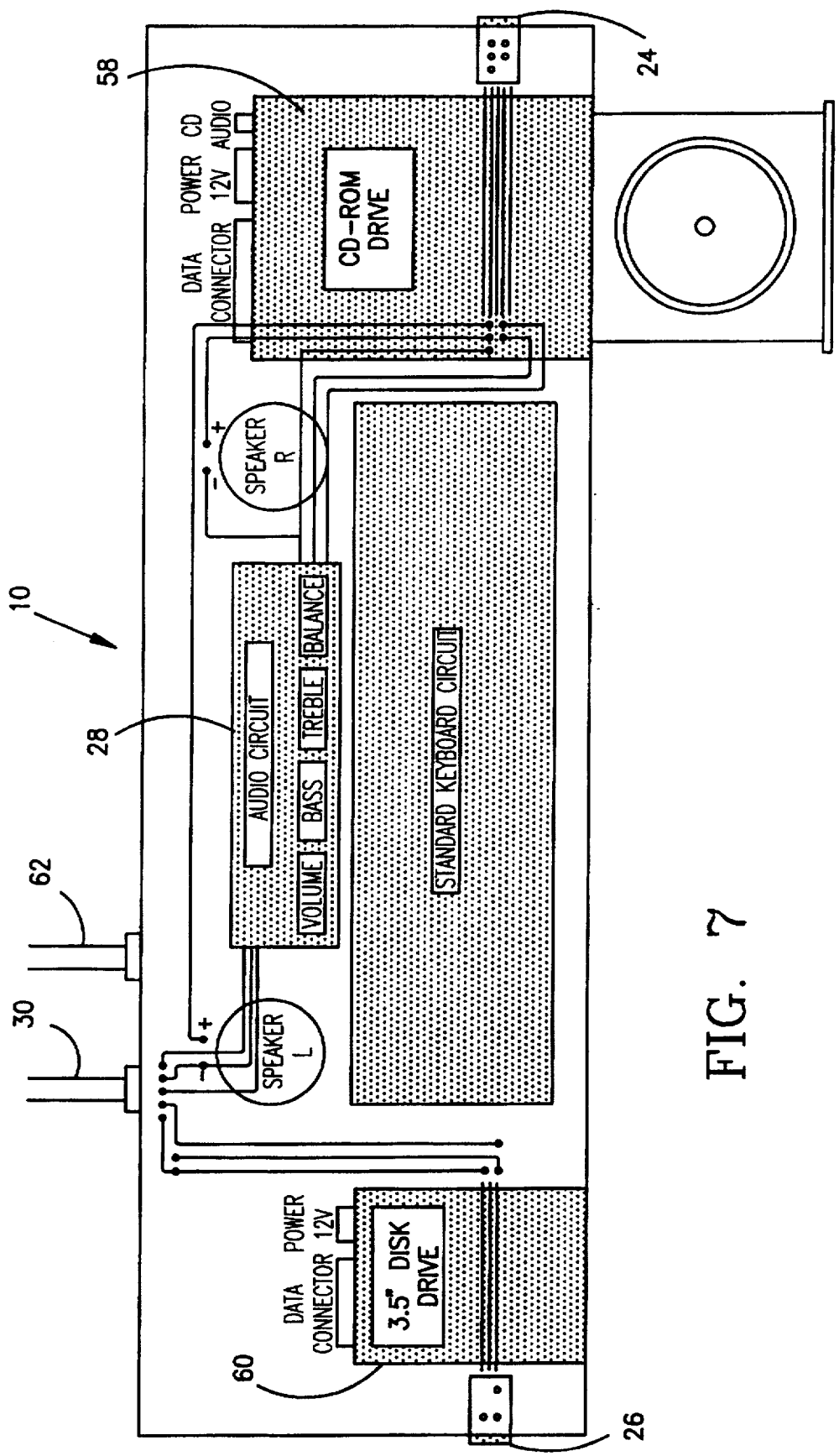
FIG. 7 is a pictorial layout showing a preferred computer keyboard embodiment with an integrated CD-ROM drive and a floppy disk drive according to the invention.

FIG. 7 shows a multimedia computer keyboard 10 with additional built in features. For example, a floppy disk drive 60 is built into the keyboard housing and then electrically connected to the drive cable 62. The drive cable 62 then connects to the rear of a CPU computer terminal. Furthermore, CD-ROM 58 is also shown built into the multimedia computer keyboard 10. While FIG. 7 shows a preferred component arrangement, a variety of arrangements are foreseen depending on the user's preferences or needs. For example, the multimedia computer keyboard may include only the floppy disk drive 60 or only the CD-ROM 58 or both.

Also, FIG. 7 shows the microphone jack 26 and the headphone jack 24 under the added floppy disk drive 60 and the CD-ROM 58 respectively. The circuit 28 and other connection circuitry is also routed to the cable 30 or to the cable 62. Although the cable 30 and the drive cable 62 are shown as two separate cables, they may also be combined into a single universal cable connected to a computer CPU terminal.

FIG. 8 shows the preferable circuit connect layout 64 for the multimedia computer keyboard 10 described in FIG. 7. The voltage source 50 is 12 volts and is referenced from the ground connect 48. The floppy disk drive 60 is electrically connected to the floppy ribbon cable 61 that also connects to the drive cable 62. The CD-ROM drive 58 is electrically connected to the CD-ROM drive ribbon cable 63 which in turn connects to the drive cable 62. The floppy ribbon cable 61 is preferably a (34) PIN ribbon cable and the CD-ROM drive ribbon cable 63 is preferably a (15 to 50) PIN ribbon cable. Alternatively, different PIN structures, electrical or ribbon connect structures may be incorporated depending on the specific drive being incorporated into the multimedia computer keyboard 10.

Also shown in FIG. 8 is the LED display and audio circuitry 46 that is electrically connected to the audio interrupt circuitry 40. Connected to the audio interrupt circuitry 40 is the headphone jack 24 connection that leads to the speakers 12. The LED indicator and audio circuitry 46 electrically connects to the sound card speaker output 34.

The attached microphone 22 is connected to the microphone interrupt circuitry 42, which in turn is connected to the sound card microphone input 44. The keyboard circuit cable 36 is connected to the standard keyboard electronic circuitry (not shown). While this circuitry arrangement is preferred, alternative arrangements may be incorporated without jeopardizing the multimedia computer keyboard's functionality and scope of the invention.

Preferably, the keyboard circuit cable 36, sound card speaker output 34, sound card microphone input 44, voltage source and the ground connect 48 are all united into one universal cable 30. Also the floppy ribbon cable 61 and the CD-ROM drive ribbon cable 63 are connected to the drive cable 62. Although the preferred embodiment of FIG. 8 shows the drive cable 62 and the cable 30 as separate cables leaving the multimedia computer keyboard 10, they may be combined into one.

Figure 9A:
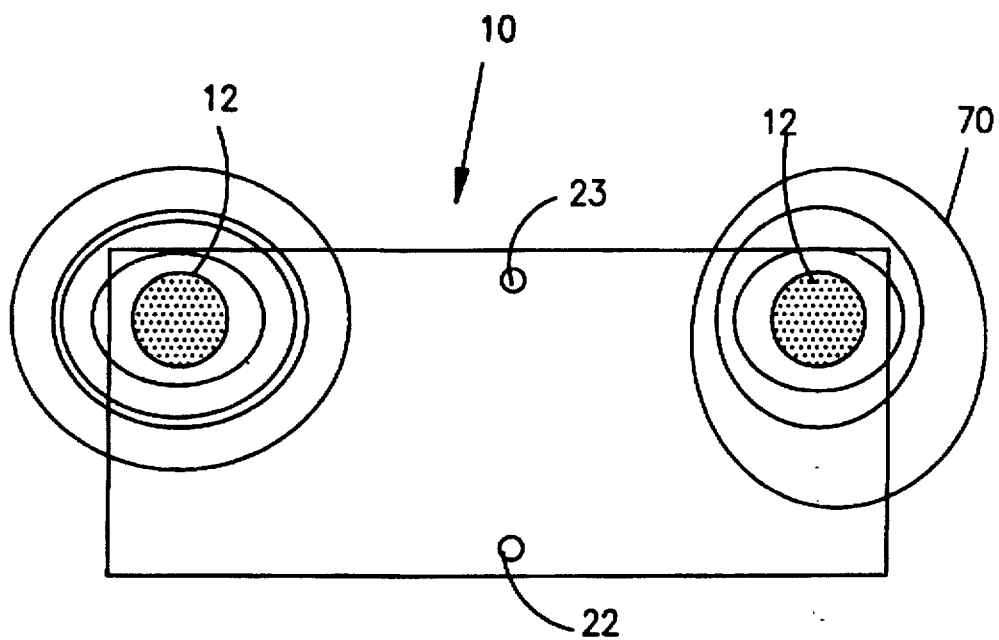
FIG. 9(a) and (b) show top-views and cross-sectional views respectively of the preferred microphone arrangement and sound wave patterns according to the invention.

FIG. 9(a) shows the multimedia computer keyboard 10 with speakers 12 preferably located in the upper top corners. The speakers 12 have circular patterns of increasing diameter indicating emanating sound waves 70. The sound waves 70 emanate radially outward in decreasing intensity. To reduce feedback through microphone 22, it is located and directed away from sound waves 70. For example, the built-in microphone 22 is located at the bottom front section of the multimedia computer keyboard 10.

Alternatively, FIG. 9(a) shows microphone 23 located at the center upper-top section of the multimedia computer keyboard 10. Microphone 23 is a retractable-extendable microphone unit as shown in FIG. 1 (b). Feedback is reduced because the sound waves are at lower intensities when they reach microphone 23 which is located symmetrically between the speakers 12 and emanating sound waves 70. Also, feedback is reduced because microphone 23 may be directed away from sound waves 70 and towards the user's voice output waves.

Figure 9B:
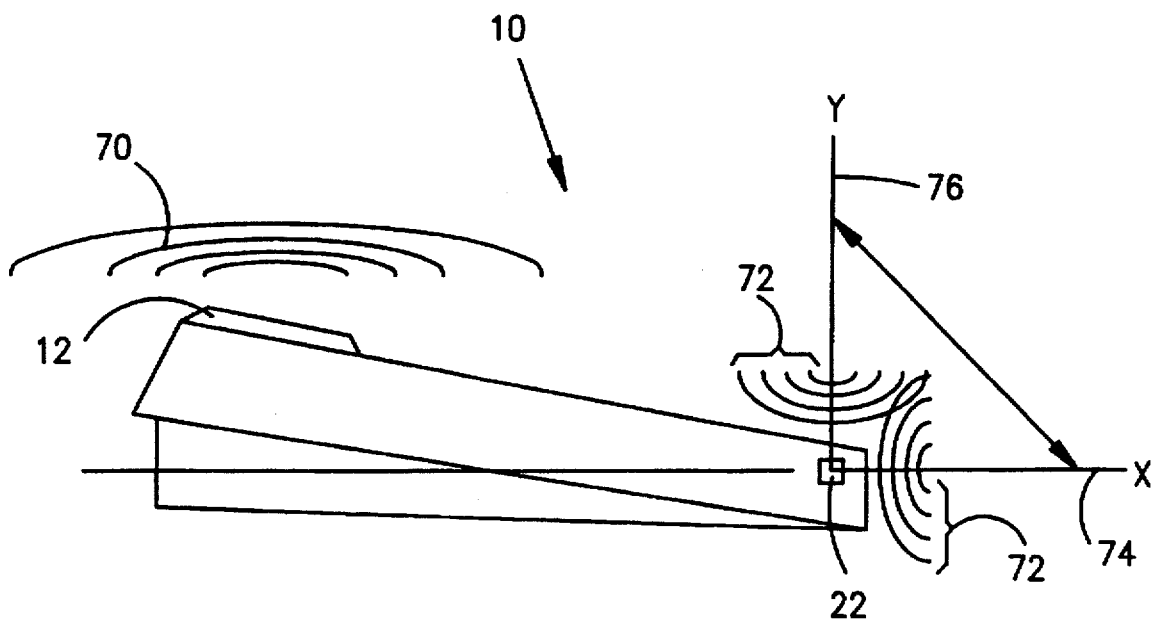

FIG. 9(b) shows a cross-sectional view of FIG. 9(a) wherein sound waves 70 are shown emanating from speakers 12. Also shown are voice output waves 72 that are directed at microphone 22. The x-y axis is shown referenced from microphone 22 wherein voice output waves 72 are shown. The y-axis 76 represents the upper most angle at which voice output waves 72 should be directed and the x-axis 74 represents the lower most angle at which voice output waves 72 should be directed. While microphone 22 may receive sound input outside the preferred angles, it is preferable to input voice between the x-y axis as shown in FIG. 9(b).

Because the multimedia computer keyboard 10 user is usually located directly in front of microphone 22; direct input usually occurs at an angle between the x-y coordinate.

Thus, to further improve feedback reduction, the microphone 22 is preferably internally positioned towards the user and away form the speakers 12 at an angle between the x-y coordinate to prevent interference from sound waves 70 or other external noise. Feedback is also reduced if the alternative microphone 23 is used by similarly directing away from the speakers 12 and further directing it towards the user within the x-y axis 76 and 74 respectively.

Although the invention has been described in conjunction with specific embodiments thereof, it is evident that many alternatives, modifications, and variations will be apparent to those skilled in the art in light of the forgoing description. Accordingly, it is intended to embrace all such alternatives, modifications, and variations which fall within the spirit and scope of the appended claims.

What is claimed is:

1. A multimedia computer keyboard for use with a personal computer, said personal computer having a CPU contained in an enclosure, said keyboard comprising:

a keyboard housing separate from said CPU enclosure;

a plurality of alphanumeric keys mounted to said housing;

at least two speakers mounted within said housing to form built-in speakers capable of stereophonic sound reproduction;

a microphone mounted to said housing to form a built-in microphone; and a headphone jack and a microphone jack mounted on said housing for connecting external speakers, headphones and microphone;

whereby said keyboard housing integrates the foregoing hardware components into a single unitary keyboard apparatus.

2. The multimedia keyboard of claim 1, further including audio circuitry to operate said speakers and keyboard circuitry that is physically and electrically separate from said audio circuitry.

3. The multimedia keyboard of claim 2, further including a control panel; said control panel being affixed to said housing wherein said control panel permits said audio circuitry control.

4. The multimedia keyboard of claim 1, wherein said CPU further includes a sound card said keyboard further including a cable containing a plurality of wires, whereby said plurality of wires provides interconnection from said computer keyboard to said computer CPU and said sound card via external jacks on said CPU enclosure.

5. The multimedia keyboard of claim 4, further including interrupt circuitry connected to said headphone jack and said microphone jack, for interrupting function of said built-in speakers and said built-in microphone when an external speaker and microphone are attached.

6. The keyboard of claim 4 wherein said cable provides power from an external power supply to said audio circuitry for improved audio performance.

7. The multimedia keyboard of claim 6, wherein said built-in microphone is attached to said housing and is pivoting and retractable.

8. The multimedia keyboard of claim 3, wherein said control panel further includes an LED display for indicating audio circuitry response.

9. The multimedia keyboard of claim 1, wherein said built-in microphone is mounted within said housing proximal the lower front center of said housing, whereby feedback of said built-in speakers is reduced.

10. The multimedia keyboard of claim 1, further including a telecommunications means that connects to said housing.

11. The multimedia keyboard of claim 1, wherein a floppy disk drive means is incorporated into said housing.

12. The multimedia keyboard of claim 1, wherein a CD-ROM disk drive is incorporated into said housing.

13. A computer system, comprising:

a computer CPU contained within an enclosure;

a monitor electrically coupled to said computer CPU for displaying information;

a sound card contained within said enclosure and electrically coupled to said computer CPU for converting digital sound input to analog sound output;

a housing separate from said CPU enclosure;

a plurality of alphanumeric keys mounted to said housing;

two speakers mounted within said housing to form built-in speakers capable of stereophonic sound reproduction;

at least one microphone mounted to said housing to form a built-in microphone;

a headphone jack and a microphone jack mounted on said housing for connection to external speakers and headphones;

audio circuitry mounted within said housing, said audio circuitry being electrically coupled to said sound card, said at least one microphone, said at least one speakers, said microphone jack and said headphone jack;

keyboard circuitry mounted within said housing, said keyboard circuitry being electrically coupled to said computer CPU and said keyboard, said audio circuitry and said keyboard circuitry being mounted in a spaced configuration;

said audio circuitry further including interrupt circuitry to disengage said at least one internal speaker when said external speakers are connected to said speaker jack and to disengage said built-in microphone when said external microphones are connected to said microphone jack.

14. The computer system of claim 13, further including a control panel mounted to said housing wherein said control panel is used to control said audio circuitry.

15. The computer system of claim 14, comprising a plurality of light emitting diodes mounted on said housing to form an LED display for indicating said audio circuitry response.

16. The computer system of claim 15, further including a cable containing a plurality of wires, whereby said plurality of wires provides interconnection from said computer keyboard to said computer CPU and said sound card.

17. The computer system of claim 16, wherein said built-in microphone is attached to said housing.

18. The computer system of claim 17, comprising:

a floppy disk drive means incorporated into said housing.

19. The computer system of claim 18, comprising:

a CD-ROM disk drive incorporated into said housing.

20. The computer system of claim 19, wherein said cable further contains said floppy disk drive and said CD-ROM disk drive wires.

21. The computer system of claim 20, wherein said cable further contains a power supply line to drive said audio circuitry from an external power source.

22. The computer system of claim 13, further including a telecommunications means that connects to said housing.

23. The computer system of claim 13, wherein said built-in microphone is mounted within said housing proximal the lower front center of said housing, whereby feedback of unwanted noise is reduced.

* * * * *